March 29, 1960 C. WHEATLEY 2,930,400
LIGHT WEIGHT CHECK VALVE
Filed Aug. 13, 1956

INVENTOR.
Charles Wheatley
BY

ATTORNEY

United States Patent Office 2,930,400
Patented Mar. 29, 1960

2,930,400

LIGHT WEIGHT CHECK VALVE

Charles Wheatley, Tulsa, Okla.

Application August 13, 1956, Serial No. 603,714

2 Claims. (Cl. 137—527.8)

This invention relates to an improvement in check valves and more particularly, but not by way of limitation, to an improved check valve of a light weight and durable construction.

The present invention contemplates a novel check valve structure which provides for a valve of considerably less weight and of a substantially smaller size than normal presently available check valves of today. For example, a standard twenty-four inch check valve available today normally weighs approximately eight thousand two hundred pounds in addition to about two thousand four hundred fifty-four pounds of weight for the connecting flanges, studs and nuts, or a total of ten thousand six hundred fifty-four pounds. A twenty-four inch valve of the present invention weighs approximately eight hundred fifty pounds in addition to the two thousand four hundred fifty-four pounds weight of the connecting flanges, studs and nuts for a total weight of three thousand three hundred four pounds. Thus, a weight reduction of more than seven thousand pounds is provided by the structure of the novel valve. An even greater weight reduction is realized in valves of a larger size. The advantages of such a great weight reduction will be apparent.

The novel valve is provided with a clapper member having an angled shank member secured to the circumference thereof and extending radially therefrom for journalling a pivot pin therethrough. Thus, the clapper may be pivotally secured within the valve body in a manner requiring a minimum of valve body length for an efficient operation of the valve. The length of the novel valve body is substantially less than that of the standard check valve of today. The twenty-four inch standard check valve usually comprises a valve body length of approximately fifty-seven and one-half inches, whereas the body length of the improved twenty-four inch valve of the invention is approximately thirteen and one-half inches. It will be apparent that the novel valve structure of the invention provides a great saving in material, thereby greatly reducing the cost of manufacture as well as facilitating the utilization thereof. Thus, the present invention provides a novel check valve which is efficient in operation and durable and economical in construction.

It is an important object of this invention to provide a novel check valve so designed and constructed to substantially reduce the weight thereof for facilitating manipulation thereof.

It is another object of this invention to provide a novel check valve having a clapper member pivotally secured therein in a manner providing for a valve body of a minimum length for efficient utilization thereof, thereby providing for a simple and economical valve construction.

It is still another object of this invention to provide a novel check valve wherein the clapper member is pivotally secured in an off-set position for constantly urging the clapper toward a closed position for assuring an efficient sealing of the valve in a closed position.

It is a further object of this invention to provide a novel check valve so constructed and arranged to eliminate heavy closure members and seating members for the clapper valve member.

It is a still further object of this invention to provide a novel check valve which is simple and efficient in operation and durable and economical in construction.

Other objects and advantages of the invention will be evident from the following detailed description, read in conjunction with the accompanying drawings, which illustrate my invention.

Figure 1:
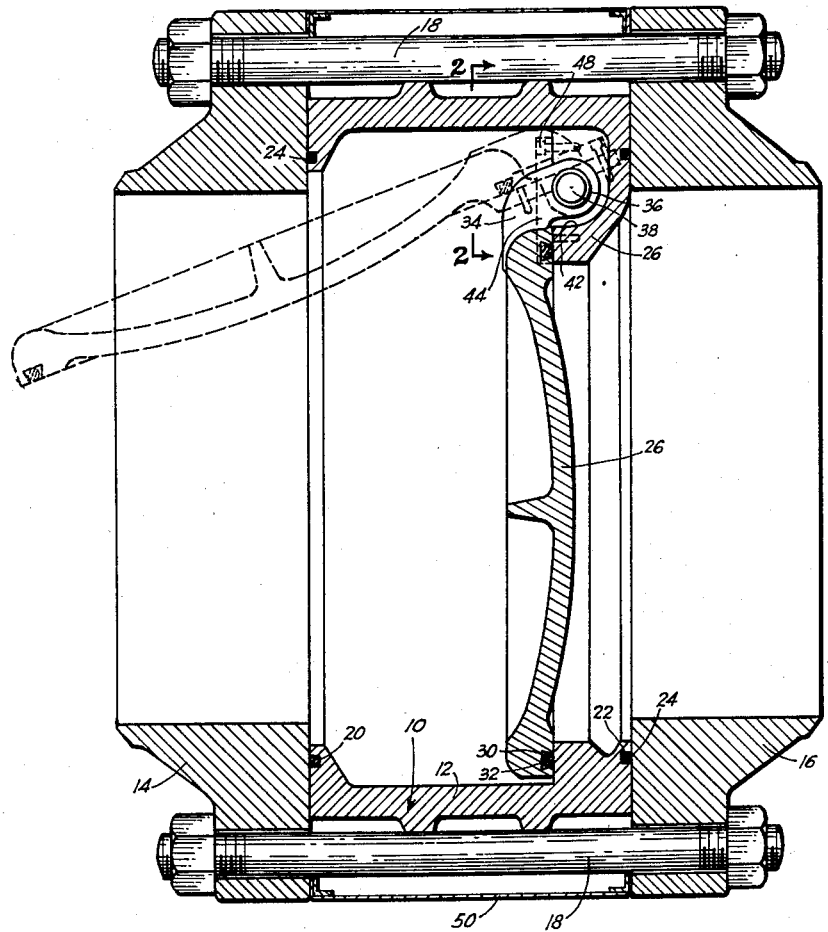
Figure 1 is a sectional elevational view of a check valve embodying the invention with portions shown in dotted lines for purposes of illustration.

Referring to the drawings in detail, reference character 10 refers in general to a check valve comprising a substantially tubular body portion 12 adapted to be interposed between a pair of oppositely disposed annular flange members 14 and 16. The flange members 14 and 16 are standard connecting members normally utilized for securing a check valve within a flow line, or the like. It will be apparent from Fig. 1 that the outer diameter of the body member 12 is sufficiently smaller than the outer diameter of the flange members to provide clearance for a plurality of circumferentially spaced stud members 18 which span the distance between the flanges 14 and 16 for securing the valve 10 therebetween. The body portion 12 is preferably provided with oppositely disposed annular grooves 20 and 22 adjacent the flange members 14 and 16, respectively, for receiving sealing ring members 24. In this manner an adequate sealing between the valve body and the flange members is assured. It will be apparent that the grooves 20 and 22 may be omitted, if desired, and a flat gasket (not shown) may be interposed between the valve and the flanges for sealing therebetween.

A circular valve seat member 26 projects inwardly within the body 12 to cooperate with a substantially disc shaped pivotal clapper member 28 for providing alternate opening and closing of the valve 10. An annular groove 30 is provided in the clapper member adjacent the valve seat 26 for receiving a sealing ring 32 to assure an efficient sealing of the valve in a closed position thereof. The clapper member 28 is provided with an angled shank member 34 which extends substantially radially from the outer circumference of the clapper member 28. The shank member 34 is provided with a suitable bearing race member 36 perpendicularly disposed therethrough for journalling a pivot pin 38 therein. It will be apparent in Fig. 1 that the axis of rotation of the pivot pin 38 is substantially to the right of the clapper member 28 to provide an off center of gravity pivot axis therefor, thus causing a constant gravitational urging of the clapper toward a closed position against the valve seat portion 26.

Figure 2:
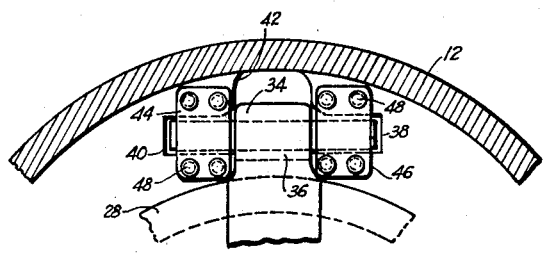
Figure 2 is a partial sectional view of the novel pivotal arrangement of the invention taken on line 2—2 of Fig. 1.

A transverse arcuate recess 40 (Fig. 2) is provided in the valve body 12 adjacent the valve seat portion 26 for receiving the pivot pin 38. The central portion of the recess 40 is enlarged at 42 to provide sufficient clearance for the shank member 34 upon rotation of the clapper 28. A pair of substantially identical plate members 44 and 46 are disposed over the opposed end portions of the arcuate recess 40 substantially adjacent the central enlarged portion 42. The plate members 44 and 46 are preferably secured to the body 12 by means of a plurality of cap screws 48. The plate members 44 and 46 retain the pivot pin securely within the arcuate recess 40, thereby precluding accidental dislodging of the clapper 28 during operation of the valve.

A tubular cover member 50, preferably made of aluminum, or the like, encircles the outer periphery of the valve 10 and is spaced therefrom to enclose the studs 18 and span the distance between the flange members 14 and 16 for protecting the studs. The cover member 50 preferably comprises two semi-circular half sections provided with outwardly extending flange members (not shown) which may be bolted together in any well known manner to secure the cover 50 around the valve. Thus, the cover member may be disposed therearound after installation of the valve 10 within a flow line (not shown). A rubber stop member or bumper (not shown) may be provided on the left side of the clapper 28 as viewed in Fig. 1 to absorb the shock as the clapper member strikes the flange 14 during an open position of the valve 10. This substantially precludes undesirable chattering of the valve during operation thereof, and reduces wear on the valve clapper member.

The valve clapper 28 may be readily installed within the valve housing 12. The pivot pin 38, extending perpendicularly through the shank 34, may be easily disposed within the recess 40 provided therefor. The plate members 44 and 46 may then be positioned adjacent the recess 40 and secured to the body 12 by the cap screws 48. In this manner a free pivotal action for the clapper 28 is provided for an efficient opening and closing of the valve. The off-center disposition of the axis of rotation of the pivot pin with respect to the clapper 28, as hereinbefore set forth, provides for a constant gravitational urging of the clapper toward a closed position, thereby assuring an efficient closure of the clapper adjacent the seat portion 26. The sealing ring 32 is provided to assure an adequate sealing of the valve in a closed position, thereby substantially precluding leakage of fluid around the clapper member 28. The valve 10 may be installed between the flanges 14 and 16 and is clamped securely therebetween by the studs 18 in any well known manner. The clapper member 28 pivots freely within the valve body 12, and in an open position thereof, extends into the flange member 14, as shown in dotted lines in Fig. 1. Thus, a minimum valve body length is required for an efficient operation of the valve 10. It will be apparent that the clapper member 28 may be readily removed from the valve 10 by releasing the cap screws 48 which permit removal of the plate members 44 and 46. The pivot pin 38 may then be removed from the recess 40 to release the clapper 28 from disposition within the valve body 12. Thus, the clapper member may be easily replaced, if desired.

During operation of the valve 10, it is preferable for the flow stream to pass therethrough from right to left as viewed in Fig. 1. The flow stream pressure acts upon the clapper face exposed thereto and moves the clapper 28 away from the valve seat portion 26 to an open position as shown in dotted lines in Fig. 1. If the flow stream is reversed for any reason, the pressure thereof against the back face of the clapper member 28 will move the clapper toward a closed position. The gravitational force on the clapper, as hereinbefore set forth, will assist in moving the clapper toward a closed position, thereby assuring an efficient operation of the valve 10.

From the foregoing, it will be apparent that the present invention provides a novel check valve of a durable construction wherein a substantial saving in material is afforded. The novel pivotal connection provided for the clapper member permits an efficient operation of the valve in a manner requiring a minimum valve body length, and eliminates the necessity of heavy closure members and seating portions. A considerable reduction in weight is provided for facilitating manipulation thereof as well as substantially reducing the cost thereof. Thus, the present invention provides a durable and light weight check valve which is efficient in operation and simple and economical in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a check valve, a substantially tubular body portion, a valve seat provided within the valve body, a clapper member pivotally secured adjacent th valve seat, sealing means provided on the clapper member adjacent the valve seat for substantially precluding leakage therearound, an angular shank member provided on the outer periphery of the clapper member and extending substantially radially therefrom, a bearing race member disposed perpendicularly through the shank member, a pivot pin journalled in the race member, said angular shank providing for an off-set axis of rotation for the clapper whereby a gravitational force constantly urges the clapper toward a closed position adjacent the valve seat, a transverse recess provided in the body portion for receiving the pivot pin, an enlarged recess portion substantially media of the transverse recess providing clearance for the shank member, and plate members secured to the body adjacent the transverse recess for retaining the pivot pin therein.

2. A check valve adapted to be interposed between connecting flanges in a flow line and comprising a substantially tubular body portion, a valve seat within the body, a clapper member pivotally secured adjacent the valve seat, sealing means provided on the clapper to cooperate with the valve seat for precluding leakage therearound, an angled shank member extending substantially radially from the clapper, a pivot pin journalled in the shank member and providing an off-set axis of rotation for the clapper whereby a gravitational force constantly urges the clapper toward a closed position adjacent the valve seat, a recess in the body for receiving the pivot pin, an enlarged portion provided substantially media of the recess for clearance for the shank member, plate members removably secured to the body portion adjacent the recess for retaining the pivot pin therein, said valve body of a smaller outer diameter than the flange members to provide clearance for a plurality of stud members extending through the flange members to clamp the body portion therebetween, and sealing means provided between the body portion and flanges.

References Cited in the file of this patent

UNITED STATES PATENTS

| | | |
|---|---|---|
| 286,676 | Belknap | Oct. 16, 1883 |
| 705,255 | Leidecker | July 22, 1902 |
| 1,399,684 | Belcher | Dec. 6, 1921 |
| 1,524,095 | Greene | Jan. 27, 1925 |
| 1,982,189 | Anderson | Nov. 27, 1934 |
| 2,268,518 | Sonderman | Dec. 30, 1941 |
| 2,729,238 | Hite | Jan. 3, 1956 |

FOREIGN PATENTS

| | | |
|---|---|---|
| 17,947 | Great Britain | of 1899 |